United States Patent

[11] 3,609,294

[72] Inventors Richard C. Cady, Jr.;
Robert M. Whiteley, both of Dayton, Ohio
[21] Appl. No. 866,140
[22] Filed Oct. 10, 1969
[45] Patented Sept. 28, 1971
[73] Assignee The National Cash Register Company
Dayton, Ohio
Continuation of application Ser. No. 672,131, Oct. 2, 1967, now abandoned.

[54] THERMAL PRINTING HEAD WITH THIN FILM PRINTING ELEMENTS

10 Claims, 7 Drawing Figs.

[52] U.S. Cl. .......... 219/216, 219/543, 338/309, 346/76
[51] Int. Cl. .......... H05b 1/00
[50] Field of Search .......... 219/216, 543; 338/306–309; 346/76

[56] References Cited

UNITED STATES PATENTS

| | | | |
|---|---|---|---|
| 2,808,351 | 10/1957 | Colbert et al. | 338/308 X |
| 2,843,711 | 7/1958 | Crick | 338/308 X |
| 3,061,911 | 11/1962 | Baker | 338/307 X |
| 3,323,241 | 6/1967 | Blair et al. | 219/543 X |
| 3,380,156 | 4/1968 | Lood et al. | 338/308 X |
| 3,478,191 | 11/1969 | Johnson et al. | 219/216 |

*Primary Examiner*—A. Bartis
*Assistant Examiner*—C. L. Albritton
*Attorneys*—Louis A. Kline, Albert L. Sessler, Jr. and Elmer Wargo ABSTRACT: A thermal printing head with thin film printing elements for marking a thermally sensitive record material is disclosed. A number of electrically resistive strips are etched from an electrically resistive material (for example, tantalum) which is formed on an electrically nonconductive substrate. An electrically conductive material, such as gold, is deposited over the tantalum strips. One area of the gold along each gold strip is then selectively etched by an etchant which does not affect the tantalum layer. The gold layer is now divided into two separate electrode portions. One electrode portion of each strip is connected to an isolation element, such as a semiconductor diode, a silicon controlled rectifier, or a semiconductor threshold device. The isolation element may be chip mounted, or it may be formed by semiconductor fabrication techniques. The isolation element is supported by the same substrate which supports the tantalum strips. The other electrode portion of each strip is connected to a second level electrical conductor, which is electrically insulated from the first level electrodes that pass under this electrical conductor by a thin dielectric layer.

A protective overcoating layer is deposited over the entire structure. One embodiment of the present invention employs a protective overcoating layer of a material having a substantial thermal conductivity and a substantial electrical resistivity which is shaped to provide a raised area over each of the resistive tantalum printing elements, so as to provide a plurality of selectively heat-concentratable raised areas for printing.

FIG. I

INVENTORS
RICHARD E. CADY, JR. &
ROBERT M. WHITELY

BY Louis A Kline
John J. Callahan
Glenn W. Bowen
THEIR ATTORNEYS

INVENTORS
RICHARD E. CADY, JR. &
ROBERT M. WHITELY

BY Louis A. Kline
John J. Callahan
Glenn W. Bowen

THEIR ATTORNEYS

INVENTORS
RICHARD E. CADY, JR. &
ROBERT M. WHITELY

Louis A Kline
BY John J. Callahan
Glenn W. Bowes
THEIR ATTORNEYS

INVENTORS
RICHARD E. CADY, JR. &
ROBERT M. WHITELY

BY Louis A. Kline
John J. Callahan
Glenn W. Bowen

THEIR ATTORNEYS

INVENTORS
RICHARD E. CADY, JR. &
ROBERT M. WHITELY

BY Louis A. Kline
John J. Callahan
Glenn W. Bowen
THEIR ATTORNEYS

THERMAL PRINTING HEAD WITH THIN FILM PRINTING ELEMENTS

CROSS REFERENCES TO RELATED APPLICATION

This application is a continuation of U.S. Pat. application Ser. No. 672,131, which was filed on Oct. 2, 1967, and which has been abandoned.

BACKGROUND OF THE INVENTION

Prior thermal printing devices are known which are constructed of a number of individual printing elements which must be aligned in a coplanar array. The number of external connections that are required for such thermal printing heads is fairly large, and, in addition, although a hard material, tin oxide, is employed for the resistive elements, abrasion is a problem with that type of thermal printing head.

The thermal printing head structure of the present invention eliminates coplanar alignment requirements, reduces the number of electrical connections that are required, and provides an abrasion-resistive overcoating layer.

SUMMARY

A thermal printing head is formed of a plurality of deposited thin film resistive printing elements which are arranged into a matrix and are connected to a selection conductor at one end through a first electrode, and are connected at the other end to an isolation device, through a second electrode. The entire structure is covered by a protective layer, which may be a material that has a substantial heat conductivity and a substantial electrical resistivity and is shaped to provide a heat-concentratable raised area over each of the resistive thermal printing elements.

DESCRIPTION OF THE PREFERRED EMBODIMENTS

Figure 1:
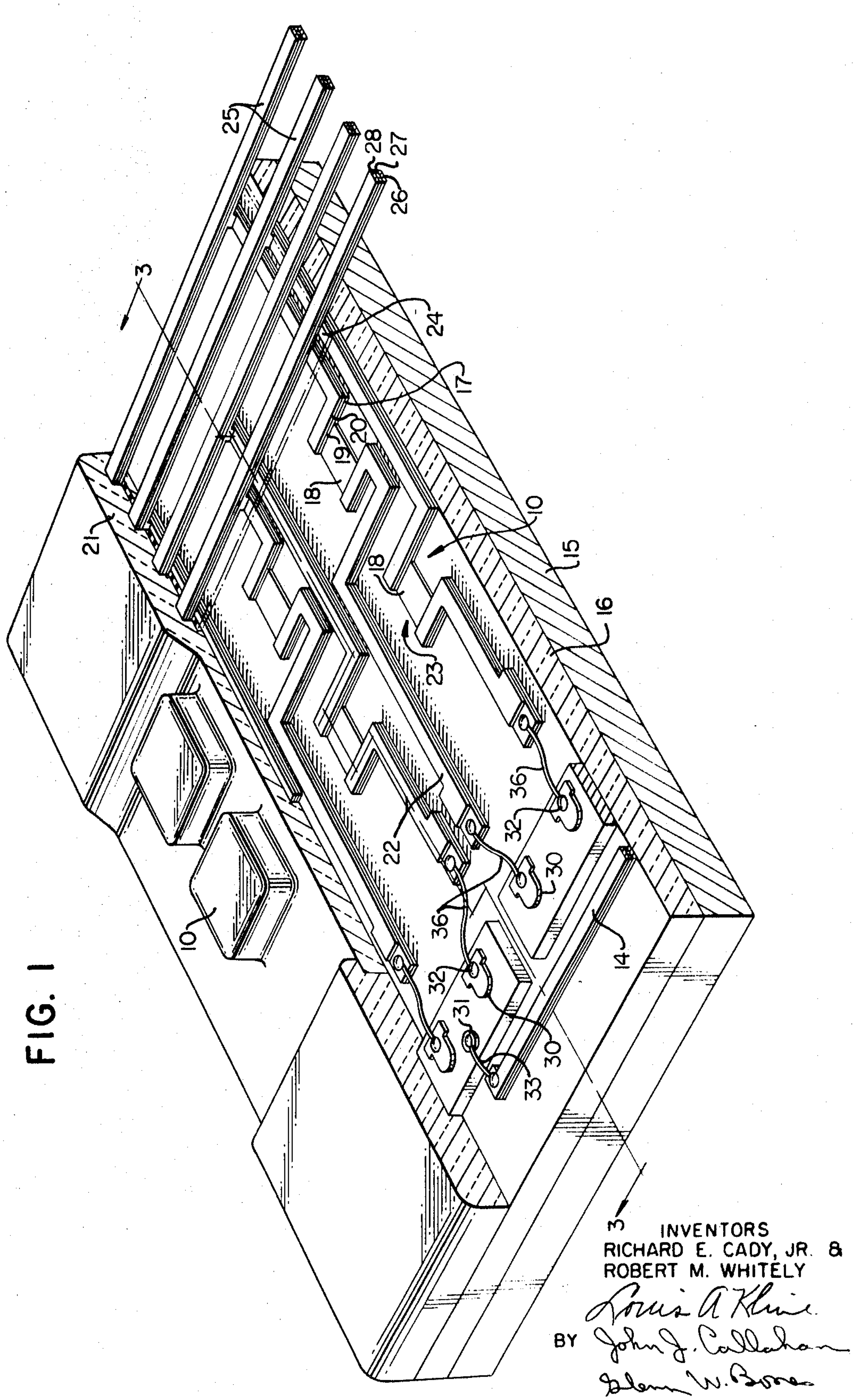
FIG. 1 is a perspective partially cutaway view of a portion of a printing head that is constructed in accordance with the present invention.
Figure 2:
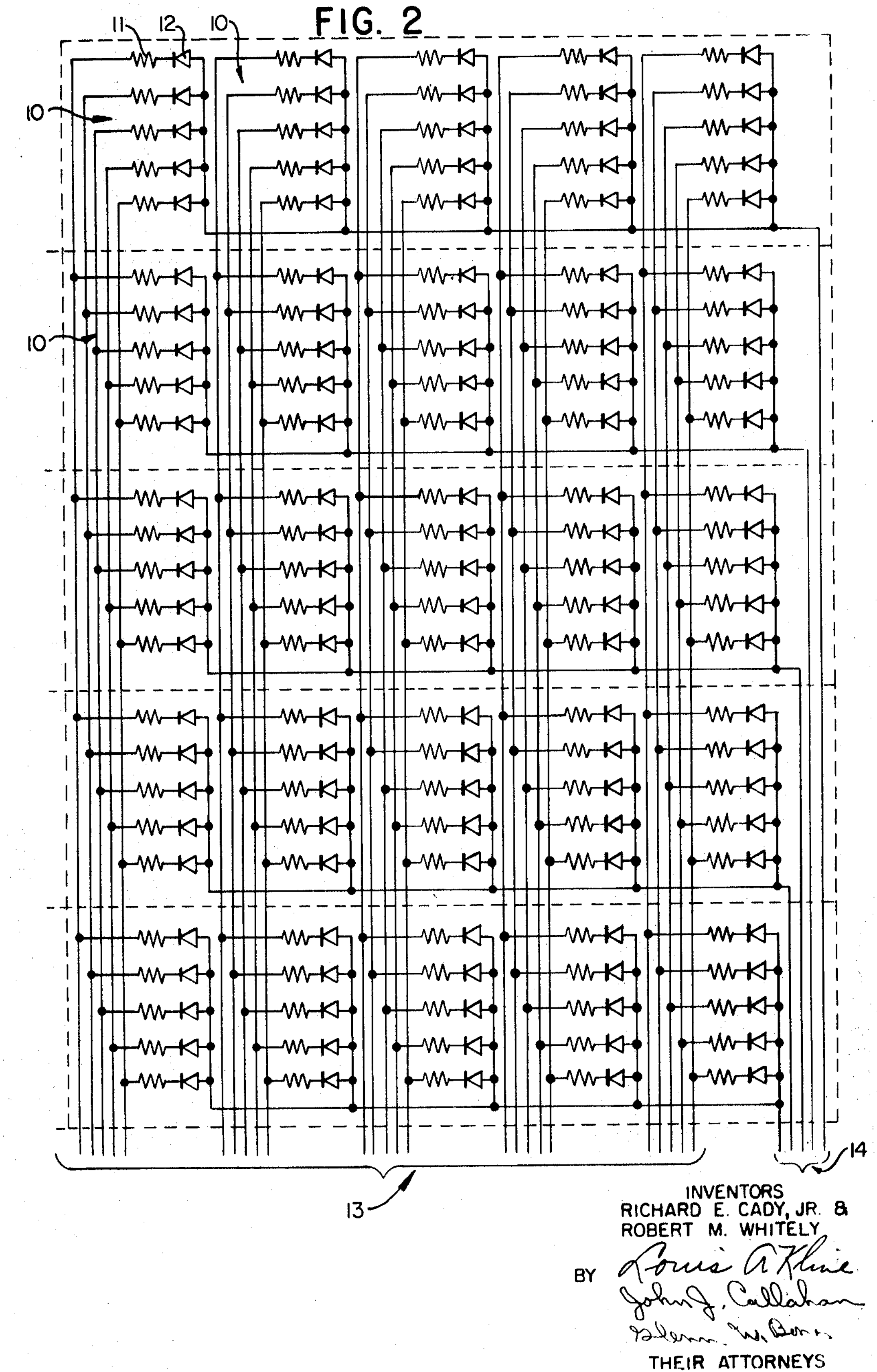
FIG. 2 is an electrical schematic wiring diagram showing the electrical interconnections for a thermal printing head in a five-by-five matrix of printing elements.

Referring first to FIGS. 1 and 2 of the drawings, there is shown the electrical schematic diagram of five five-by-five matrices of printing elements 10. Each printing element 10 contains a resistive member 11 and an isolation diode 12. Each one of the five matrices is capable of printing a symbol or character. The printing elements 10 are incorporated in the novel printing head of the present invention.

Printing is accomplished by bringing a thermally sensitive record material, such as a paper provided with a coating that will turn dark when heated, into intimate contact with the printing head and impressing a voltage by means of the electrical supply conductors 13 and the common return circuit conductors 14 across the proper printing elements 10 to form a desired symbol. The conversion of electrical energy to heat energy in the resistive member 11 raises the temperature of a printing element 10 sufficiently to darken the record material where it contacts the energized printing elements.

The diagram of FIG. 2 shows the manner in which 25 supply conductors 13 can energize 125 printing elements 10. The printing elements 10 which are to be energized at any one time are selected in each one of the five matrices by energizing the desired supply conductors 13 and at the same time grounding the common conductor 14 that is connected to the desired matrix. By successively grounding the common conductor 14 that is connected to each matrix, energization of the printing elements 10 of each of the matrices may be effected without affecting the other matrices of the printing head.

Figure 3:
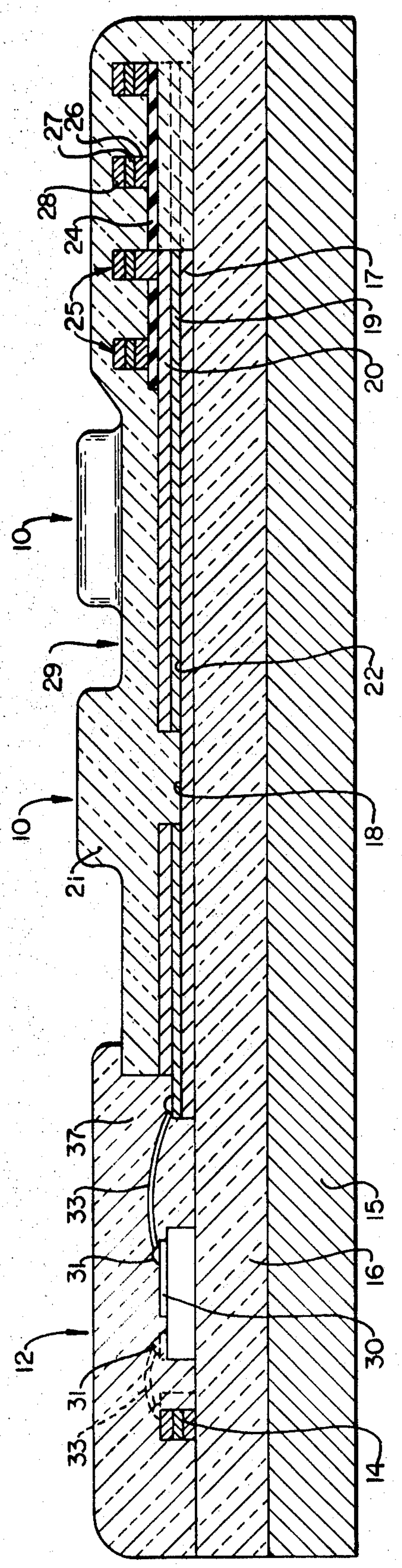
FIG. 3 is a sectional elevation taken generally along the line 3—3 of FIG. 1.

Referring now to FIGS. 1 and 3, there is shown a thermal printing head wherein the printing elements 10 are arranged in a two-by-two matrix, rather than in five-by-five matrices as illustrated in FIG 2. Two of these matrices are shown in FIG. 1. Accordingly, the printing elements 10 and their electrical connections may form printing heads for printing characters. In addition, several different printing head configurations and means of making electrical connection to their printing elements 10 may be formed composed of a single row of printing elements 10, such as may be used in facsimile printer. Also, the character printing head may take the form of a matrix of rectangular printing elements, or it may take the form of a bar configuration.

The printing head, shown in FIGS. 1 and 3, comprises a plurality of printing elements or areas 10. It has a support member 15, of aluminum or other heat-conductive material, which serves to function as a heat sink, and a flat substrate 16, of high-resistivity material, such as glass, which is attached to the support member 15. Upon the substrate 16 are deposited, successively, a layer 17 of resistive material, such as tantalum, which serves as material for the heating resistive member 18, a layer 19 of low electrical resistive material, such as gold, for the interconnection conductors or leads, and, finally, a top layer 20 of a material, such as tantalum, that will cause adherence of a protective layer 21 of an electrically insulating material such as silicon dioxide ($SiO_2$), or of an electrically insulating material having high thermal conductivity, such as beryllium oxide ($BeO$) or aluminum oxide ($Al_2O_3$). the beryllium oxide or aluminum oxide layer will not adhere well if directly applied to a chemically inert metal such as gold. A thin layer of beryllium may also be applied as the protective overcoat, and beryllium will oxidize to form $BeO$.

Conventional vacuum sputtering methods are used to deposit the layers 17 19, and 20. The thickness of the tantalum layer 17 and the sputtering parameters are adjusted to provide the desired adhesion, resistivity, and temperature coefficient of resistance of the layer. Typically, the tantalum layers 17 and 20 are 1,000 angstroms thick. The gold layer 19 provides a low resistivity layer that is used in the electrical interconnection lead pattern of the printing head, and it is typically 2,000 angstroms thick. The layer 20 of tantalum is deposited over the gold layer 19 to provide adhesion between the electrical interconnection leads and the dielectric layer and the protective layer 21. The layer 20 is provided because the gold layer 19 is chemically inert and will not form a strong bond with the protective layer 21, as will the tantalum layer 20. If aluminum were used as the conductive layer 19, the overlaying tantalum layer would not be required to achieve adherence of the protective layer 21. All three layers 17, 19, and 20 are deposited sequentially during a single pumpdown of the vacuum system.

The following photolithographic masking and etching steps are executed in the following order. First, the printing head, containing the three layers 17, 19, and 20, is masked to delineate areas for the resistive members 18 and areas for the first level electrical interconnection conductors 22. The three layer 17, 19, and 20 are etched off except in those ares where the electrical interconnecting conductors 22 and the resistive members 18 will be located. Then, the printing elements 10 are masked to delineate the resistive members 18. In this step, the electrical interconnection conductors 22 formed by the layers 17, 19, and 20 are protected by the photoresist, but the resistive members 18 are exposed to the etchants.

The following etching steps occur and perform the following functions. An etchant, such as one containing one part hydrofluoric acid, one part nitric acid, and two parts water, that attacks the tantalum layer 20 but not the gold layer 19, etches off the tantalum layer 20 over the resistive member 18. Then, an etchant, such as one containing 3 parts hydrochloric acid, 1 part nitric acid, and 4 parts water, that attacks the gold layer 19 but not the tantalum layer 20, etches off the gold layer 19 over the resistive member 18, thereby leaving only the first-deposited tantalum resistive member 18.

As a result of the foregoing steps, only the first deposited tantalum layer 17 is left in the area 23 to form the resistive member 18, while the first level interconnection conductors 22 each have a tantalum layer 17, a gold layer 19, and a tantalum layer 20.

The materials used for the layers 17, 19, and 20, though described to be tantalum, gold, and tantalum, respectively, in the specific embodiment, might be other materials having the following properties. These materials should adhere well to the substrate 16, to each other, to the dielectric layer, and to the protective layer 21. The layers 17, 19, and 20 are also selectively etchable; that is, the etchant for the tantalum layer 20 does not attack the gold layer 19, nor does the etchant for the gold layer 19 attack the tantalum layer 20. Also, the three layers 17, 19, and 20 lend themselves to controlled deposition, in which the parameters of interest are controllable. Further, the three layers 17, 19, and 20 will, when deposited and fabricated into a printing head, withstand repeated temperature cycling from room temperature to above 300° C., and, further, the resistive member 18 preferably has a positive temperature coefficient of resistance.

Next, a thin layer 24 of a dielectric material, such as a glass, is deposited by conventional radio frequency sputtering techniques over parts of the first level interconnection conductors 22 in areas where the second or top level interconnection conductors 25 are to be deposited. Although glass generally is not as good a heat conductor as BeO or $Al_2O_3$, it may be used to cover the entire printing head structure to provide abrasion resistance and to protect the resistive printing elements from oxidation. The tantalum printing elements, if oxidized, will increase in resistance substantially, thereby reducing the efficiency of the printing element. Furthermore, if the overcoating layer 24 of dielectric material is sufficiently thin (less than 10,000 angstroms), the layer may function to spread heat from the printing elements. The layer 24 serves to electrically isolate the first and second level interconnection conductors from each other. Openings are then etched in the layer 24 in areas where the first and second level interconnection conductors 22 and 25 are to be electrically connected together.

The second level interconnection conductors 25 may have the same structure as the first level interconnection members 22. That is, the conductors 25 comprise a bottom layer 26 of tantalum, an intermediate layer 27 of gold, and a top layer 28 of tantalum. Preferably, the layers 26, 27, and 28 are deposited only in the areas of the printing head where the second level interconnection conductors are needed. The layers 26, 27, and 28 are then etched to define the second level interconnection conductors 25.

Next, a thin layer protective layer 21 of electrically insulating material, such as beryllium oxide or aluminum oxide, may be deposited by conventional radio frequency vacuum sputtering techniques over the glass substrate 16, the heating resistive members 18, and the electrical interconnection conductors 22 and 25. It does not, however, cover the diode bonding pads or the external contact pad areas. The protective layer 21 adheres well to the foregoing underlying members, has a high thermal conductivity, offers good abrasion resistance, and withstands repeated rapid temperature cycling from room temperature to above 300° C. The protective layer 21 serves to protect the heating resistive members 18 and the electrical interconnection conductors 22 and 25 from mechanical and abrasion damage. The protective layer 21 also serves to conduct heat away from the heating resistive members 18 out to the extremities of the printing elements 10. For the foregoing to be done efficiently, the material of the protective layer 21 is chosen to have a thermal conductivity much higher than that of the glass substrate 16. The thin layer protective layer 21 must be made sufficiently thick to provide a relatively low thermal impedance path, however.

The isolation diodes 12 for the thermal printing head are contained in chips 30, which are attached to the substrate 16. As shown in FIG. 1, each chip 30 contains four common cathode (or anode) diodes 12. For the five-by-five matrix printing head represented in FIG. 2, 25 isolation diodes 12 would be used, and, for a three-by-five matrix printing head, 15 isolation diodes 12 would be used. The diode chips 30 are provided with the electrical contacts 31 and 32. An electrical connection 33, in the form of a gold wire, is connected by ball-bonding techniques to the electrical contact 31 on a chip 30 to a first level conductor 14, which serves as a common conductor for the printing elements of a matrix. A gold wire 36 is also electrically connected made by ball-bonding techniques between the electrical contact 32 on a chip 30 and a respective one of the first level interconnection conductors 22. Although in the embodiment shown in FIGS. 1 and 3 ball-bonded electrical connections are utilized, the electrical connection of the isolation diode chips 30 to the conductors 22 may be made by other methods.

Finally, a protective layer 37 is placed over the diode chips 30. This protective layer 37 is an encapsulant which serves to protect the diode chips 30 from mechanical damage.

A print head with two or more levels of thin film heating resistors may also be constructed. This configuration eliminates the need to use a matrix print-type font, which is inherent in the previous two configurations. Two or more levels of resistors are needed to eliminate the objectionable gaps that would exist if only one level of resistors were to be used to print a 64-character alpha-numeric set. Isolation diodes may, as before, be diffused into the substrate silicon, and these isolation diodes may have one electrode connected to a common line for each character, and another electrode connected to the heating resistors. The print element would not be isolated thermally, as in the previous configuration. The high temperature areas covered by the heating of the resistors, which could be either straight or curved, will define the printed character, and this will require that both layers of heating resistors be very close to the printing surface.

Figure 4:
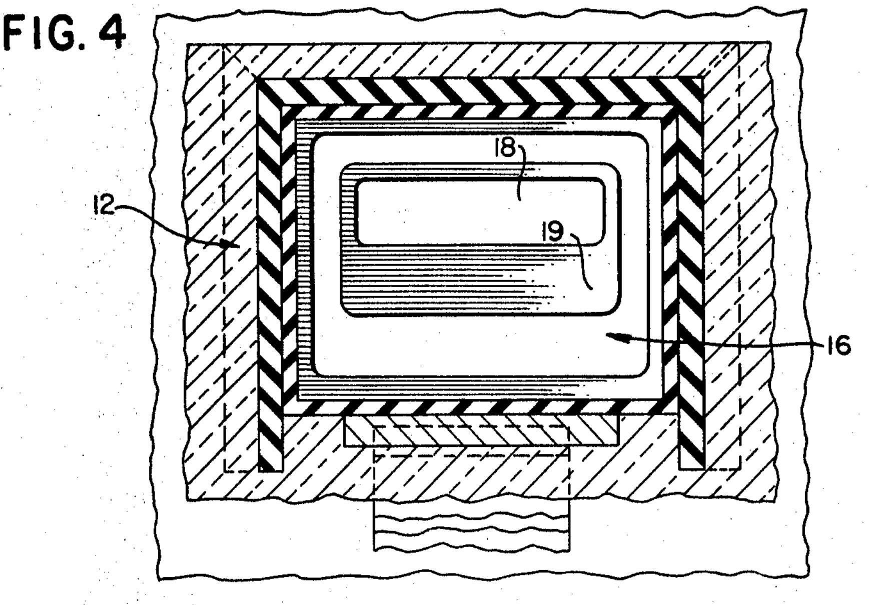
FIG. 4 is a top view taken along the line 4—4 of FIG. 5.
Figure 5:
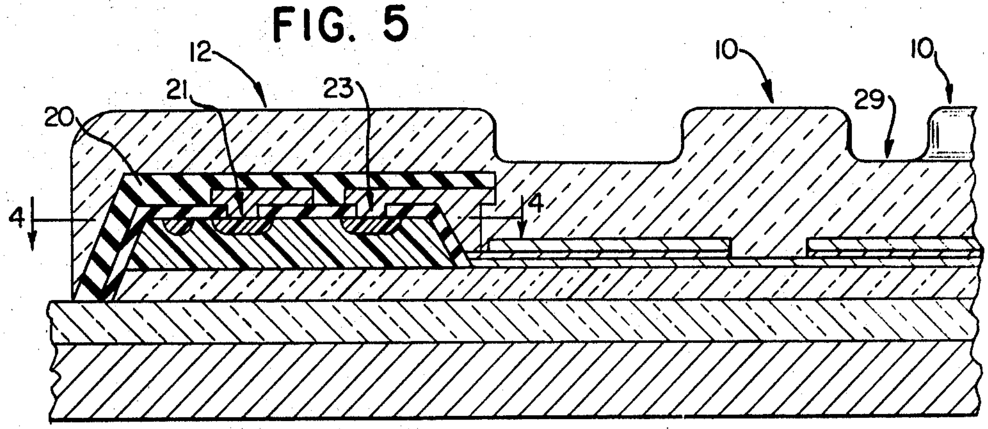
FIG. 5 is a side profile view showing a printing head with a diffused semiconductor isolation diode.

An integral print head may also be constructed by substituted diffused diodes, as shown in FIGS. 4 and 5. The following steps are performed using photolithographic, etching, and diffusion techniques that are standard in the art. The islands 16 of FIG. 4, for example, are delineated and etched, and the diffused P-type region 18 is formed therein. Then, the islands 16 are again delineated and etched, and a diffused N+-type region 19 is formed therein. The islands are again delineated, and the silicon dioxide layer 20, which was formed during and after each of the prior diffusion steps, is etched away to form holes 21 and 23 therein, through which ohmic contact is made to the underlying semiconductor material. The isolation diode 12 is then formed of material of the island 16, the P-type region 18 comprising the diode anode, and the N+-type region 19.

The N-type single-crystal silicon layer formed into the islands 16 largely determines the reverse-breakdown voltage of the isolation diodes 12 and is chosen with the proper N-type impurity concentration so as to provide a satisfactory diode yield. The N+-type regions 19 are so formed that nonrectifying electrical contact can be made to the isolation diode by means of an electrical conductor. The proximity of an N+-type 19 to the anode (region 18) of the isolation diode strongly affects the diode forward resistance. Additionally, the geometry of the P-type region 18, which forms the anode of the isolation diode 12, may be varied, and this effects the reverse leakage of the isolation diode 12.

In the present invention, the isolation diodes may be replaced by one or more active elements such as a transistor, a field-effect transistor, or a silicon controlled rectifier or a two-terminal threshold device. The greatest advantage that an active isolation device offers is an increase in printing speed. With a resistor-diode configuration, all of the characters sharing common element drive line must be print serially. Additionally, if the diode is an integral part of the print element and gets very hot (above 150° C.), one must wait for the diodes associated with the first character to cool down to where they have an effective forward-to-reverse current resistance ratio before the diodes associated with the next character are energized. If a print element is driven to 250° C. with a 10-millisecond drive pulse, the recovery time is approximately 6 milliseconds, and the printing rate is about 60 characters per second.

Figure 6:
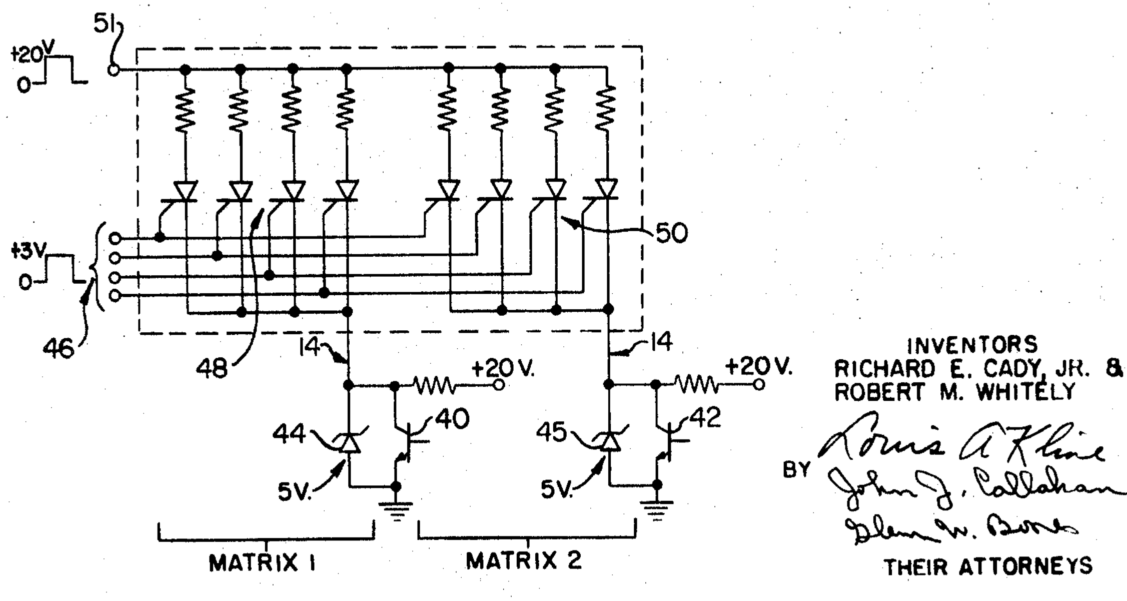
FIG. 6 is an electrical schematic diagram showing a thermal printing head selection matrix which employs silicon controlled rectifiers as the isolation element.

If an active element such as a silicon controlled rectifier, which can serve as a memory element, is used, the printing rate may be greatly increased by energizing successive characters very rapidly, so that the entire character line is energized at the same time. All characters are turned off simultaneously by removing the drive voltage to the entire head. If the turn-on rate is great enough, the difference in on-time between the first character and the last character may be neglected. A method of implementing this approach is shown in FIG. 6 for two characters in two different matrices. The silicon controlled rectifier may be mounted on a chip, and double layer interconnections may be made to the silicon controlled rectifier, as shown in FIG. 7.

When the transistors 40 and 42 are cut off, the cathodes of the silicon controlled rectifiers 48 and 50 are at the zener voltage of the zener diodes 44 and 45. Thus, even if the element selection lines 46 are all at a positive potential, none of the silicon controlled rectifiers 48 and 50 will be turned on, provided that the zener voltage is more positive than the voltage on the selection lines 46.

However, if the transistor 40 is turned on, the cathodes of the silicon controlled rectifiers 48 in matrix 1 will go to ground, and the desired silicon controlled rectifiers will be triggered on by a positive voltage on the appropriate selection lines 46. If the transistor 40 is then turned off, the cathodes of the silicon controlled rectifiers 48 in matrix 1 will rise to a positive voltage level, and the triggered silicon controlled rectifiers 48 will stay on. The silicon controlled rectifiers 50 in matrix 2 will not be triggered on because their cathodes were at a positive voltage level. However, with several print elements in matrix 1 conducting, it is desired to also energize selected print elements of matrix 2. To accomplish this, the transistor 40 is cut off, the transistor 42 is turned on, and the desired selection lines 46 are placed at a positive voltage level. The selected silicon controlled rectifiers in matrix 2 are then turned on, and the transistor 42 is cut off. The state of the silicon controlled rectifiers 48 in matrix 1 will remain unchanged, however, since the cathodes of the silicon controlled rectifiers 48 will remain at a voltage level that is more positive than the voltage level on the selection lines 46. The print cycle is terminated when the external positive DC voltage pulse supplied to the terminal 51 falls to a ground potential level. A device such as this might also be driven by half-wave rectified AC, which could be taken from a constant-voltage regulator transformer.

Figure 7:
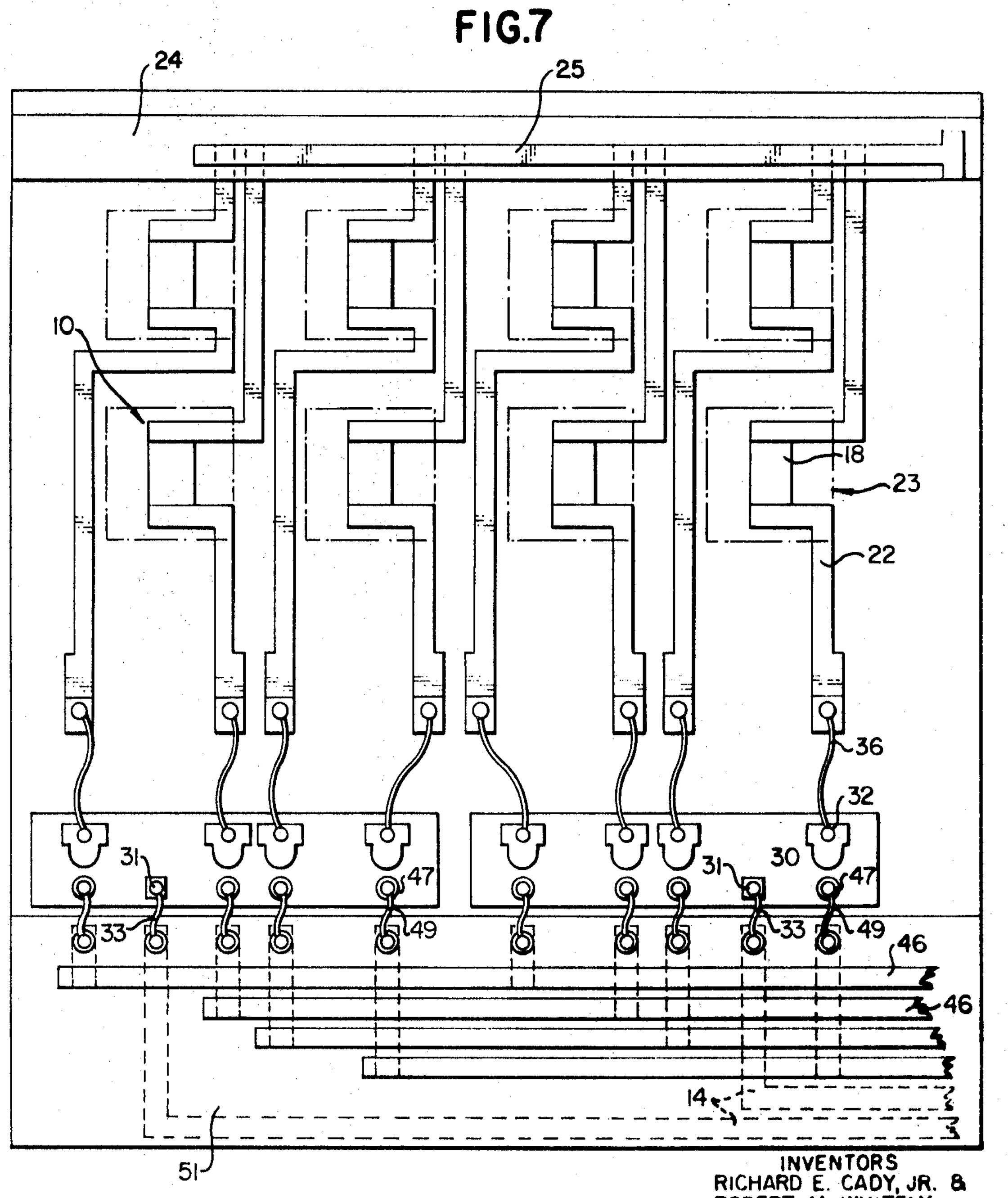
FIG. 7 is a top view of a printing head containing a matrix of printing elements and chip-mounted silicon controlled rectifier elements.

FIG. 7 shows a portion of a printing head matrix in which the chip-mounted diodes of FIG. 1 are replaced by chip-mounted silicon controlled rectifiers. In this case, in addition to the first level common conductors 14, a plurality of second level conductors 46 to receive selection voltage pulses are also required. The conductors 46 may be constructed of successive layers of tantalum, gold, and tantalum, as previously described. The conductors 46 are connected to the gate contacts 47 of the silicon controlled rectifiers 48 and 50 by ball-bonded electrical conductors 49. The conductors 46 are insulated from the character common conductors 14 by an insulating layer 51. The anode contacts 32 of the silicon controlled rectifiers 48 and 50 are connected to the interconnection conductor 22 by a bonded gold wire 36, and the character common conductors 14 are connected to the cathode contacts 53 of the silicon controlled rectifiers 48 and 50 by a bonded gold wire 33. Other connection methods may be used, such as "-flip-chip" bonding, for example.

Semiconductive two-terminal or three-terminal threshold switches which switch from a high impedance state to a low impedance state when the voltage across them exceeds a predetermined threshold level, and which switch from a low impedance state to a high impedance state when no current is supplied through them, may be turned on in a manner analogous to the described silicon controlled rectifiers, and, therefore, this type of device may also be employed in the present invention.

What is claimed is:

1. A thermal printing device comprising:

a. an electrically insulating substrate, b. a plurality of elongated printing bars on a supporting surface of the substrate, the printing bars being arranged to define an information pattern, each of the printing bars having:

1. a first layer of a material having a substantial electrical resistivity,
2. a second layer of a material having a substantial electrical conductivity, the second layer of the printing bar overlying and being continuously in contact with only the first layer of the printing bar except for an uncovered heat-generating element portion of the first layer of the printing bar, the second layer of the printing bar being thereby divided into first and second electrode portions by the heat-generating element portion of the first layer of the corresponding printing bar. the second layer of material having a substantially greater conductivity than said first layer, and
3. a third layer of a material having a substantial electrical resistivity, the third layer of the printing bar being continuously in contact with the second layer of the printing bar but not in contact with the heat-generating element portion of the first layer of the printing bar, c. an insulating layer of an electrically insulating material on that portion of the third layer of each printing bar which overlies the first electrode portion of the second layer of the corresponding printing bar, d. a plurality of elongated electrical selection conductors on the insulating layer, the elongated electrical selection conductors being electrically connected to the third layer of predetermined printing bars through openings in the insulating layer, e. a plurality of electrical isolation elements on the supporting surface of the substrate, each electrical isolation element having at least a first terminal and a second terminal and each electrical isolation element having its first terminal electrically connected to the second electrode portion of the second layer of a separate one of the printing bars, the electrical isolation elements being constructed to initially have a high impedance state with respect to the first and second terminals thereof when the voltage across the first and second terminals is at a first predetermined value, and to have a low impedance state with respect to the first and second terminals thereof when the voltage across the first and second terminals is at a second predetermined value, f. at least one elongated electrical common conductor on the supporting surface of the substrate that is electrically connected to the second terminals of a plurality of electrical isolation elements, in common, and g. a protective layer of an abrasion-resistive material having a substantial thermal conductivity and sufficient electrical resistivity to prevent electrical shorting of the heat-generating elements to each other, the protective layer being deposited on all of the foregoing elements and being shaped to form a raised area over each of the heat-generating element portions of the first layers of the printing bars.

2. A device as in claim 1 wherein the protective layer is beryllium oxide (BeO).

3. A device as in claim wherein the protective layer is aluminum oxide ($Al_2O_3$).

4. A device as in claim 1 wherein the elongated electrical selection and common conductors comprise:

a. a first layer of a material having substantial electrical resistivity, b. a second layer of a material having a substantial electrical conductivity, the second layer of the conductor being continuously in contact with the first layer of the conductor, and c. a third layer of a material having a substantial electrical resistivity, the third layer of the conductor being continuously in contact with the second layer of the conductor, and the first layers of each of the elongated electrical selection conductors being electrically connected to the third layer of predetermined printing bars through openings in the insulating layer and the first layers of each of the elongated electrical common conductors being on the supporting surface of the substrate.

5. A device as in claim 4 wherein the protective layer is beryllium oxide (BeO).

6. A device as in claim 4 wherein the protective layer is aluminum oxide ($Al_2O_3$).

7. A device as in claim 4 wherein each of the first and third layers of the printing bars, the elongated electrical selection conductors, and the elongated electrical common conductors are formed of the same material.

8. A device as in claim 7 wherein the protective layer is beryllium oxide (BeO).

9. A device as in claim 7 wherein the protective layer is aluminum oxide ($Al_2O_3$).

10. A device as in claim 1 wherein a portion of said substrate is covered by an epitaxially grown, single-crystal, semiconductor layer, and wherein said electrical isolation elements are semiconductor diodes which are diffused into said semiconductor layer.